United States Patent
Stonecipher, Jr.

(10) Patent No.: US 9,859,831 B2
(45) Date of Patent: Jan. 2, 2018

(54) CONTROL SYSTEM USING FLUX FEEDBACK

(71) Applicant: Caterpillar Inc., Peoria, IL (US)

(72) Inventor: Kenneth Stonecipher, Jr., Metamora, IL (US)

(73) Assignee: Caterpillar Inc., Peoria, IL (US)

( * ) Notice: Subject to any disclaimer, the term of this patent is extended or adjusted under 35 U.S.C. 154(b) by 276 days.

(21) Appl. No.: 14/575,548

(22) Filed: Dec. 18, 2014

(65) Prior Publication Data

US 2016/0181959 A1  Jun. 23, 2016

(51) Int. Cl.
| | |
|---|---|
| *H02P 27/00* | (2006.01) |
| *H02P 23/14* | (2006.01) |
| *H02P 21/14* | (2016.01) |
| *B60L 11/12* | (2006.01) |
| *B60L 11/14* | (2006.01) |
| *B60L 11/18* | (2006.01) |
| *B60L 15/20* | (2006.01) |

(52) U.S. Cl.
CPC ............ *H02P 23/14* (2013.01); *B60L 11/126* (2013.01); *B60L 11/14* (2013.01); *B60L 11/1864* (2013.01); *B60L 15/20* (2013.01); *H02P 21/14* (2013.01); *B60L 2210/30* (2013.01); *B60L 2210/40* (2013.01); *B60L 2220/12* (2013.01); *B60L 2220/14* (2013.01); *B60L 2220/50* (2013.01); *B60L 2240/26* (2013.01); *B60L 2240/421* (2013.01); *B60L 2240/423* (2013.01); *B60L 2240/642* (2013.01); *Y02T 10/6217* (2013.01); *Y02T 10/641* (2013.01); *Y02T 10/643* (2013.01); *Y02T 10/644* (2013.01); *Y02T 10/645* (2013.01); *Y02T 10/7005* (2013.01); *Y02T 10/7061* (2013.01); *Y02T 10/7077* (2013.01); *Y02T 10/7241* (2013.01); *Y02T 10/7275* (2013.01); *Y02T 10/7291* (2013.01); *Y02T 90/16* (2013.01)

(58) Field of Classification Search
USPC .......................................... 318/798, 151, 153
See application file for complete search history.

(56) References Cited

U.S. PATENT DOCUMENTS

| | | | |
|---|---|---|---|
| 4,348,620 A * | 9/1982 | Simon | B60L 11/04 318/151 |
| 4,890,058 A | 12/1989 | Trenkler et al. | |
| 5,038,092 A * | 8/1991 | Asano | H02M 7/53875 318/799 |
| 5,680,025 A | 10/1997 | Bowers, III et al. | |

(Continued)

FOREIGN PATENT DOCUMENTS

| | | |
|---|---|---|
| EP | 0 886 147 | 12/1998 |
| JP | 57-156653 | 9/1982 |

*Primary Examiner* — Eduardo Colon Santana
*Assistant Examiner* — Iftekhar Mustafa

(57) ABSTRACT

A control system using flux feedback is disclosed. The control system may be for an electric motor of a machine. The control system may have a control mechanism configured to selectively provide electricity from a generator to the electric motor. The control system may also have at least one first sensor configured to generate a signal indicative of a state of a magnetic flux produced by the electric motor. The control system may further have a controller in communication with the control mechanism and the first sensor, the controller configured to adjust operation of the control mechanism based on the signal.

4 Claims, 2 Drawing Sheets

(56) References Cited

U.S. PATENT DOCUMENTS

| | | | |
|---|---|---|---|
| 5,726,911 | A | 3/1998 | Canada et al. |
| 7,834,573 | B2 | 11/2010 | Lindsey et al. |
| 7,880,473 | B2 | 2/2011 | Chari et al. |
| 7,888,894 | B2 * | 2/2011 | Sugawara ............... B60K 6/46 318/139 |
| 8,095,324 | B2 | 1/2012 | Dooley |
| 8,564,284 | B2 | 10/2013 | Leonov |
| 2005/0065693 | A1 * | 3/2005 | Wang ..................... B60L 15/10 701/70 |
| 2008/0226474 | A1 * | 9/2008 | Yoshida ............. F04D 13/0666 417/366 |
| 2016/0141982 | A1 * | 5/2016 | Yim ....................... H02P 27/08 318/400.17 |

* cited by examiner

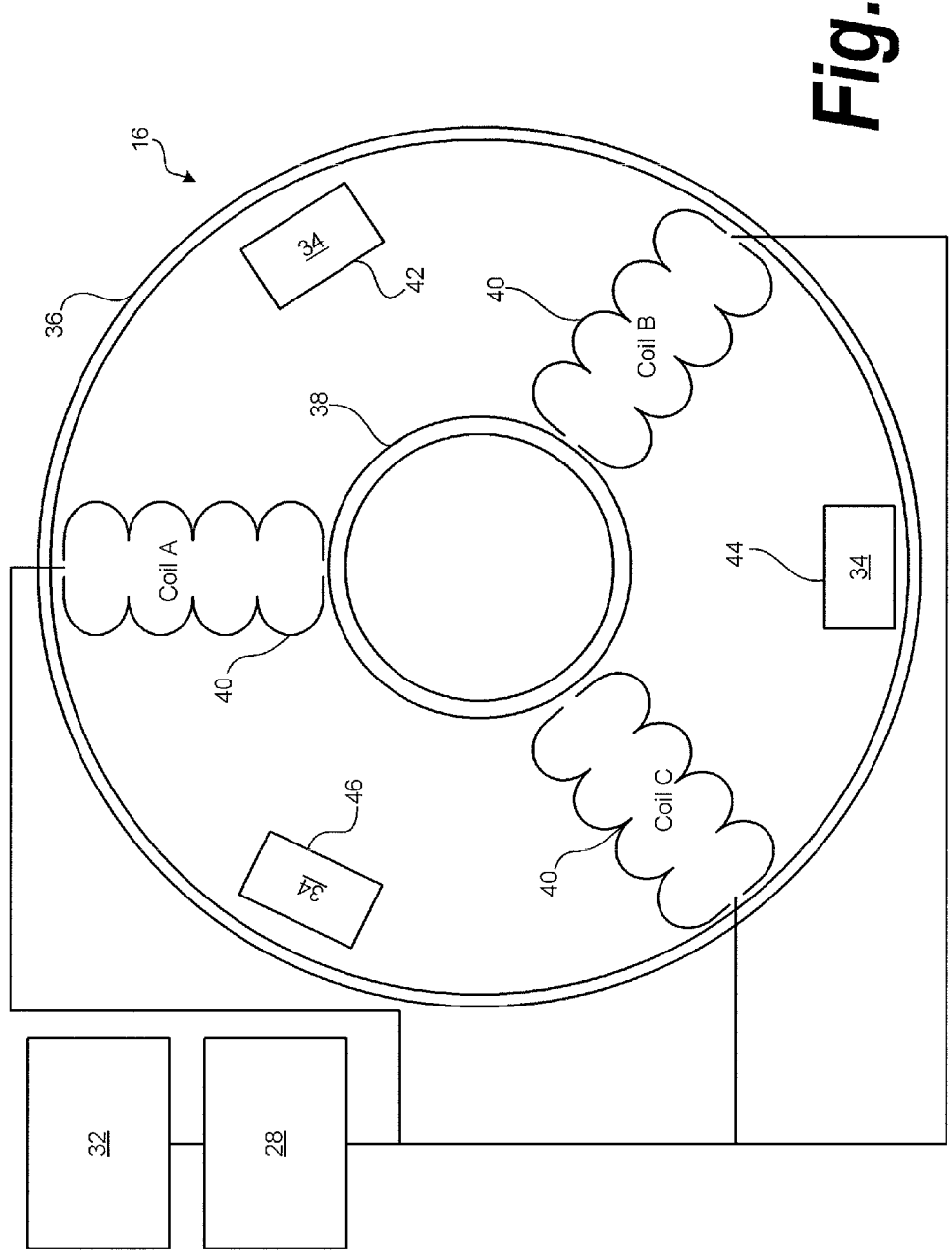

CONTROL SYSTEM USING FLUX FEEDBACK

TECHNICAL FIELD

The present disclosure is directed to a control system and, more particularly, to a control system using flux feedback.

BACKGROUND

Heavy mobile machines, such as on-and off-highway trucks, are commonly used in mining, construction, transportation, quarrying, logging, and other industries. Many heavy mobile machines employ an internal combustion engine to supply mechanical power to drive a generator. The generator produces electric power, which is used to drive one or more electric motors coupled to the wheels of the machine. An electronic controller regulates the amount of electricity supplied to the motors. For example, as an operator presses an accelerator pedal, the electronic controller will command the generator to supply a corresponding amount of electricity to the traction motors, thereby producing torque to the wheels and moving the machine.

In some machines, the electric motors are induction motors that include a rotor and a stator. Electricity supplied to the stator of the electric motor will produce a rotating magnetic field that induces a current in the rotor. A magnetic field corresponding to the current in the rotor interacts with the rotating magnetic field of the stator, causing the rotor to rotate. Rotation of the rotor is translated into rotation of a machine wheel, thereby moving the machine. While these types of motors are useful in converting electrical energy into mechanical rotation, they may be less than ideal at efficiently using the electricity, especially in mobile machine applications where torque requirements may vary with operating conditions. Therefore, it would be useful to monitor the state of an induction motor in order to determine whether it is operating efficiently, and improve performance, as needed.

One system that monitors an induction motor is described in U.S. Pat. No. 5,726,911, which issued to Canada et al. on Mar. 10, 1998 ("the '911 patent"). In particular, the '911 patent describes a self-contained device that includes various sensors that monitor the state of an induction motor. The sensors include a temperature sensor, a flux sensor, a vibration sensor, and a clock. Based on data collected by these sensors, the health and condition of the motor may be ascertained.

While the system of the '911 patent may be helpful to diagnose some problems associated with a motor, it may not address problems associated with inefficient operation and allocation of electrical energy. For example, while the system of the '911 patent may be capable of determining when a motor is overheating (and therefore should be serviced), it does not address inefficiencies experienced by a motor during operation. In particular, the system of the '911 patent may not address issues that are faced by traction motors in mobile machine applications, such as changes in torque requirements depending on operating conditions.

The present disclosure is directed to overcoming one or more of the problems set forth above and/or other problems of the prior art.

SUMMARY

In one aspect, a control system for an electric motor of a machine is disclosed. The control system may include a control mechanism configured to selectively provide electricity from a generator to the electric motor. The control system may also include at least one first sensor configured to generate a signal indicative of a state of a magnetic flux produced by the electric motor. The control system may further include a controller in communication with the control mechanism and the first sensor, the controller configured to adjust operation of the control mechanism based on the signal.

In another aspect, a method of controlling an electric motor of a machine is disclosed. The method may include determining a state of a magnetic flux produced by the electric motor. The method may also include comparing a value associated with the state of the magnetic flux to an expected value. The method may further include adjusting operation of a control mechanism that supplies electricity to the electric motor based on the comparison.

In yet another aspect, a mobile machine is disclosed. The mobile machine may include a power source, a generator operably connected to the power source and configured to produce electricity, and an electric motor operably connected to the generator and including a stator and a rotor. The mobile machine may also include a control system configured to control operation of the electric motor. The control system may include a control mechanism configured to selectively provide electricity from the generator to the electric motor, thereby producing a rotating magnetic field having an associated magnetic flux. The control system may also include a first sensor configured to generate a first signal indicative of a state of the magnetic flux, and a second sensor configured to generate a second signal indicative of at least one of a weight or tilt of the machine. The control system may further include a controller. The controller may be configured to determine a value associated with the magnetic flux based on the first signal, and determine an expected value based on the second signal. The controller may be further configured to compare the value to the expected value, and adjust operation of the control mechanism based on the comparison.

BRIEF DESCRIPTION OF THE DRAWINGS

FIG. 2 schematically illustrates the electric motor of FIG. 1, consistent with disclosed embodiments.

DETAILED DESCRIPTION

Figure 1:
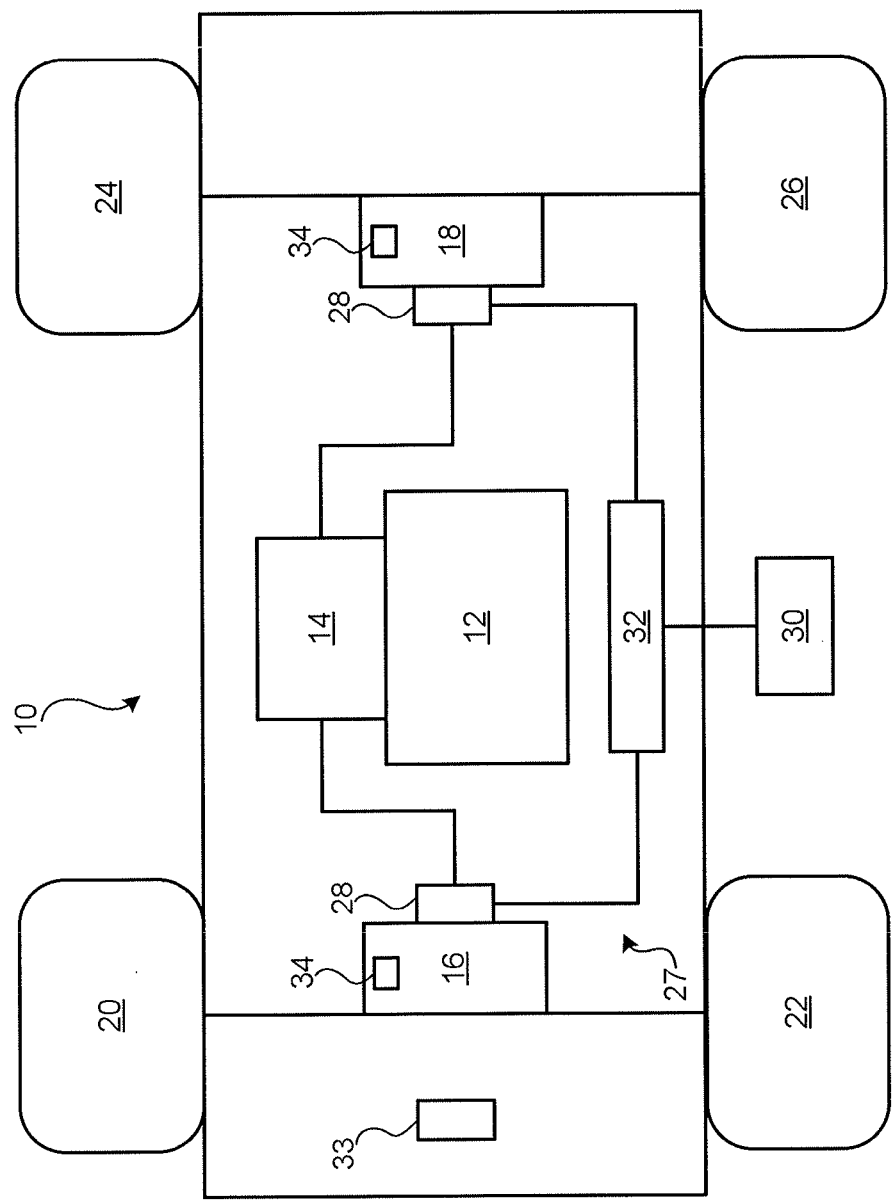
FIG. 1 schematically illustrates an exemplary mobile machine including an electric motor, consistent with disclosed embodiments.

FIG. 1 illustrates an exemplary machine 10. Machine 10 may be a mobile vehicle that performs some type of operation associated with an industry such as mining, construction, farming, transportation, or any other industry known in the art. For example, machine 10 may be an on-highway or off-highway truck. Machine 10 may also be an earth-moving machine, such as a wheel loader, an excavator, a track-type tractor, a backhoe, a motor grader, or any other suitable earth-moving machine known in the art. Machine 10 may include a power source 12, a generator 14, motors 16 and 18, and traction devices 20, 22, 24, and 26. Machine 10 may also include a control system 27.

Power source 12 may provide power output for the operation of machine 10. Power source 12 may embody a combustion engine, such as a diesel engine, a gasoline engine, a gaseous fuel powered engine (e.g., a natural gas engine), or any other type of combustion engine known in the art. Power source 12 may alternatively embody a noncombustion source of power, such as a fuel cell or a power storage device. Power source 12 may provide a rotational output to drive generator 14, thereby providing electricity for driving motors 16 and 18.

Generator 14 may be operably connected to power source 12. For example, generator 14 may be a device configured to produce a power output in response to a rotational input provided by power source 12. It is contemplated that generator 14 may embody, for example, a permanent magnet-type generator, an asynchronous generator, or any other type of generator configured to produce either alternating current or direct current electrical energy. Generator 14 may include a rotor (not shown) rotatably connected to power source 12 by any means known in the art, such as, for example, a direct crankshaft connection, a driveshaft, a gear train, a hydraulic circuit, or in any other appropriate manner.

Motors 16 and 18 may be electric motors operably connected to receive power from generator 14 and create rotation of the traction devices. Motors 16 and 18 may be alternating current (AC) motors. In an exemplary embodiment, motors 16 and 18 are three-phase induction motors. It is contemplated that, in other embodiments, motors 16 and 18 may be direct current motors, or any other appropriate type of motors known in the art. In one embodiment, an output of motors 16 and 18 may be operably connected to traction devices 22 and 24, respectively, through gear mechanisms (e.g., final drives). It is also contemplated that motors 16 and 18 may be coupled to traction devices 22 and 24 via a direct shaft coupling (not shown) or in any other manner known in the art.

Other electrical components (not shown) may be located between generator 14 and motors 16 and 18, such as rectifiers, inverters, and other components known in the art. In an exemplary embodiment, a control mechanism 28 may be positioned between generator 14 and motors 16 and 18. Control mechanism 28 may be a switching mechanism configured to control the supply of electricity to one or more of motors 16 and 18. For example, control mechanism 28 may include an array of insulated gate bipolar transistors (IGBTs) configured to selectively control electrical power supplied to motors 16 and 18, although other mechanisms are possible (e.g., MOSFET).

Traction devices 20, 22, 24, and 26 may embody one or more wheels located on machine 10 and configured to allow translational motion of machine 10. Alternatively, traction devices 20, 22, 24, and 26 may include tracks, belts, or other appropriate traction devices. Any of traction devices 20, 22, 24, and 26 may be driven and/or steerable. In one embodiment, traction devices 20 and 22 may be idling wheels that are not connected to a power or torque source and traction devices 24 and 26 may be driven wheels that are driven by motors 16 and 18, respectively. It is contemplated that the driven traction devices may alternatively be the front traction devices or that all of the traction devices may be driven by one or more motors.

Control system 27 may be connected to one or more components of machine 10 and configured to control operation of machine 10. For example, control system 27 may receive input regarding control of machine 10 and produce one or more signals to control one or more components of machine 10 in conjunction with the input. In an exemplary embodiment, control system 27 may include an operator input device 30, a controller 32, at least one condition sensor 33, and at least one motor performance sensor 34.

Operator input device 30 may include one or more devices utilized by an operator to control one or more aspects of machine 10. Operator input device 30 may be located onboard or offboard of machine 10. Operator input device 30 may embody single or multi-axis joysticks, wheels, levers, knobs, push-pull devices, buttons, pedals, or any other input devices known in the art. For example, operator input device 30 may include a throttle configured to control an acceleration of machine 10. The throttle may control the acceleration of machine 10 by, for example, controlling power source 12, generator 14, and/or motors 16 and 18.

Controller 32 may include one or more computing devices such as one or more microprocessors. For example, controller 32 may embody a general microprocessor capable of controlling numerous machine functions. Controller 32 may also include all of the components required to run an application such as, for example, a computer-readable memory, a secondary storage device, and a processor, such as a central processing unit. Various other known circuits may be associated with controller 32, including power source and other appropriate circuitry. In addition, controller 32 may include communication hardware and/or software configured to perform one or more processes to allow controller 32 to communicate (e.g., wirelessly or through a wired connection) with other components of machine 10 (e.g., operator input device 30).

Condition sensor 33 may include a plurality of sensing devices configured to monitor one or more parameters associated with operating conditions of machine 10. For example, condition sensor 33 may include a weight sensor configured to measure a weight of machine 10, a tilt sensor configured to determine a degree to which machine 10 is traveling uphill or downgrade, a speed sensor configured to measure a speed of machine 10, and/or any other sensor that may identify an operating condition of machine 10. Condition sensor 33 may be connected to controller 32 such that controller 32 may determine one or more condition parameters, which controller 32 may use in controlling one or more components of machine 10 (e.g., motor 16). In this way, controller 32 may use operating conditions (e.g., loading conditions, uphill/downgrade conditions, speed conditions, etc.) when determining how to control components of machine 10.

Motor performance sensor 34 may be a sensing device configured to detect a parameter associated with machine 10 and produce a signal indicative of the parameter. In an exemplary embodiment, sensor 34 may be a sensing device configured to measure a parameter associated with one of motors 16, 18. For example, sensor 34 may generate a signal indicative of a performance parameter of motor 16, and transmit the signal to controller 32 (or other component of machine 10) for use in controlling motor 16. Sensor 34 may be configured to provide feedback associated with operation of motor 16 such that controller 32 may adjust operation of motor 16 to thereafter improve operation of motor 16, based on the feedback.

FIG. 2 further depicts the components of motor 16, including a plurality of motor performance sensors 34. It should be understood that, while motor 16 is described in detail, the description may also apply to motor 18, which may also include a sensor 34 for providing feedback control. Further, it should be understood that FIG. 2 is a schematic depiction of motor 16. The exact configuration and operation of motor 16 may vary depending on the type of motor and its components.

As described above, motor 16 may be a three-phase AC induction motor. It should be understood, however, that motor 16 may be another type of motor. As shown in FIG. 2, motor 16 may include a stator 36 and a rotor 38. Stator 36 may be electrically connected to generator 14 by control mechanism 28. Rotor 38 may be mechanically connected to traction devices 20, 22 (e.g., through a drive train).

Stator 36 and rotor 38 may be configured to interact with each other to convert electrical power into mechanical rotation. In an exemplary embodiment, stator 36 may include a plurality of coils 40. The coils 40 may be electrically connected to generator 14 such that electricity may be selectively supplied to coils 40. In embodiments in which motor 16 is a three-phase AC induction motor, stator 36 may include three coils 40, including coil A, coil B, and coil C, connected to each other in a manner known in the art. For example, coils 40 may be connected to each other in a wye or delta configuration. Control mechanism 28 may be electrically connected to coils 40 to selectively control an amount and direction of current flow through coils 40. Rotor 38 may be a cylindrical component configured to rotate about an axis. Rotor 38 may be configured to allow an electrical current to flow therethrough, as is known in the art.

Controller 32 may communicate with control mechanism 28 to selectively provide electricity to coils 40. For example, controller 32 may receive a signal from operator input device 30, and determine that power should be provided to traction devices 20, 22 by providing power to coils 40. Control mechanism 28 may individually control coils 40 such that separate control of electricity supplied to coil A, coil B, and coil C may be achieved. For example, control mechanism may adjust a direction and/or magnitude of electricity supplied to coil A, separately from adjustments made to coils B and C.

As current flows through coils 40, a rotating magnetic field is created. Electricity is separately supplied to coil A, coil B, and coil C in a manner that repeatedly alternates the direction and magnitude of current flowing through coils 40, causing the electricity to peak in each coil 40 at different times. These phased, alternating currents produce the rotating magnetic field. The rotating magnetic field induces a current in rotor 38. A magnetic field associated with the current in rotor 38 interacts with the rotating magnetic field of the stator, causing rotor 38 to rotate. The rotation is transferred to traction devices 20, 22 to move machine 10.

Sensor 34 may be configured to monitor a performance parameter of motor 16, generate a signal indicative of the performance parameter, and transmit the signal to controller 32. In an exemplary embodiment, sensor 34 may be configured to detect a performance parameter of motor 16 that is indicative of an amount of torque on motor 16. Controller 32 may receive a signal from sensor 34 indicative of the amount of torque, and control motor 16 to efficiently produce an amount of power that corresponds to the detected amount of torque. Controller 32 may also use information from sensor 33 in determining how to control motor 16. In this way, controller 32 may selectively match power input to operating conditions and thereby efficiently use energy produced by machine 10.

In one embodiment, sensor 34 may be a flux sensor. Sensor 34 may be configured to block magnetic flux associated with the rotating magnetic field produced by coils 40 of stator 36 and determine a state of the magnetic flux. In one example, sensor 34 may be one or more of a dielectric material, diamagnetic material, ceramic material, or superconducting material. The properties of these materials allow them to produce a signal that indicates a magnitude and/or direction of magnetic flux.

As shown in FIG. 2, sensor 34 may include a plurality of sensors 34 positioned around a periphery of stator 36. As coils 40 receive electricity, sensors 34 may be configured to monitor the rotating magnetic field that is produced. As the magnetic field rotates, a magnitude and direction of magnetic flux will also change and rotate. Sensors 34 may detect and measure the magnetic flux, producing and transmitting signals that controller 32 may use to determine a state of the rotating magnetic field.

In one embodiment, sensors 34 may be arranged to separately monitor a magnetic field associated with each of the three phases of the three-phase AC induction motor. In particular, sensors 34 may include a first phase sensor array 42, a second phase sensor array 44, and a third phase sensor array 46. Each sensor array 42, 44, 46, may be configured to measure magnetic flux in three dimensions. For example, each sensor array 42, 44, 46 may include three sensors, each configured to measure magnetic flux in one of the three dimensions. In this way, sensors 34 may determine, for each magnetic field produced by coils 40, a magnitude and direction of the magnetic flux, in three dimensions.

Understanding the state of the rotating magnetic field is helpful to controller 32 because the magnetic field is affected by a torque applied to motor 16. For example, during normal operating conditions, such as when machine 10 is properly loaded and traveling at a constant speed on a relatively flat surface, motor 16 may easily output the necessary torque to move machine 10. That is, when an operator provides input via operator input device 30, the amount of electrical power provided to motor 16 is likely to match an amount of torque that is needed. During these conditions, the rotating magnetic field is "normal."

However, when operating conditions change, the rotating magnetic field may change. For example, when machine 10 is heavy and/or traveling up a hill, the amount of torque required to move machine 10 may not match the amount of power that is requested of motor 16 (e.g., based on operator input through operator input device 30). Motor 16 may require more power to meet the additional torque. The change also affects the rotating magnetic field, which may be rotating too fast to move rotor 38 efficiently (rotor 38 may be slowed by the additional torque). Sensors 34 may be configured to determine that the magnetic field has changed (based on changes in magnetic flux), and provide feedback to controller 32.

When using a conventional traction motor, an operator may recognize that a torque requirement exceeds an amount of power being provided to the motor, and provide input to provide additional power (e.g., advance the throttle further). This, however, is inefficient, because the motor may be provided with more power than it needs to meet the excess torque requirement. In an exemplary embodiment, controller 32 may be configured to use flux feedback from sensors 34 to determine if any changes in the operation of motor 16 could be made to use available power more efficiently, such as provide additional power when torque requirements are higher than expected and conserve power when torque requirements are lower than expected. An exemplary process by which controller 32 may use feedback from sensors 33 and 34 is described in more detail below.

INDUSTRIAL APPLICABILITY

The disclosed control system is applicable to efficiently control a drive system, including an electric motor. The disclosed control system may be particularly applicable to traction motors, especially traction motors for mobile machines, because torque associated with these traction motors is likely to vary depending on operating conditions. For example, a mining truck may be fully loaded or empty, traveling up a hill, on flat ground, or downgrade. These conditions will change an amount of torque required to move traction devices 20, 22, 24, and 26. The disclosed control system is configured to monitor these conditions, and intelligently and efficiently allocate power when needed, such that energy is not wasted. An exemplary method for operating machine 10 with torque feedback will now be described.

During operation, power source 12 may produce power that generator 14 stores as electrical energy. For example, power source 12 may be an engine that produces mechanical output that rotates a rotor of generator 14. Generator 14 may convert the rotation into electrical energy. The electrical energy may be selectively supplied to motors 16 and 18 to cause rotation of traction devices 20, 22, 24, and 26, thereby moving machine 10.

Motor 16 may cause rotation of traction devices 20 and 22 by causing stator 36 to produce a rotating magnetic field, which causes rotor 38 to rotate. The rotating magnetic field may be produced by regulating control mechanism 28 to alternate the direction and magnitude of current that flows through coils 40. For example, current may be provided to coils A, B, and C in the same sinusoidal patterns, offset by 120°, such that each coil successively reaches maximum and minimum current at constant intervals. This operation produces the rotating magnetic field, which induces current in rotor 38. The induced current has its own magnetic field, which interacts with the rotating magnetic field, causing rotor 38 to rotate. Rotation of rotor 38 is translated into rotation of traction devices 20 and 22, thereby moving machine 10.

Rotation of rotor 38 is also influenced by an amount of torque required to move traction devices 20 and 22. As the torque requirement changes, the rotating magnetic field produced by stator 36 will change. In an exemplary embodiment, controller 32 may be configured to monitor for any changes in the rotating magnetic field, via motor performance sensors 34. For example, controller 32 may compare measured magnetic flux to an expected value. If the difference between the measured magnetic flux and the expected value is greater than a threshold, controller 32 may determine that operation of motor 16 should be adjusted.

In an exemplary embodiment, controller 32 may determine an expected value based on operating conditions of machine 10. For example, controller 32 may receive signals from condition sensors 33 and determine, based on the signals, an expected value for the magnetic flux. For instance, controller 32 may determine a weight and tilt of machine 10. Based on the weight and tilt, machine 10 may determine an expected magnetic flux value (which may be a range of values) that corresponds to an amount of torque that would normally be necessary to move machine 10, given the measured weight and tilt. In this way, controller 32 may determine, based on a measured magnetic flux, whether the amount of power provided to motor 16 matches an amount of power needed to efficiently move machine 10.

If controller 32 determines that a difference between a measured state of the magnetic flux and an expected value of the magnetic flux is greater than a threshold value, controller 32 may communicate with control mechanism 28 to adjust operation of control mechanism 28. For example, controller 32 may adjust control mechanism to adjust the timing and/or magnitude of current provided to stator 36, thereby adjusting the rotating magnetic field such that the magnetic flux matches the expected value.

In some embodiments, controller 32 may operate to adjust the rotating magnetic field by monitoring individual phases of the magnetic field produced by the coils 40. For example, controller 32 may compare a measured magnetic flux associated with coil A to an expected value, and, if sufficiently different, adjust control mechanism 28 to change the timing and/or magnitude of electrical current provided to coil B. If the measured magnetic flux associated with coil B is within an expected range, controller 32 may determine that a sufficient adjustment has been made. If however, the magnetic flux associated with coil B still sufficiently differs from the expected value, controller 32 may adjust control mechanism 28 to change the timing and/or magnitude of electrical current provided to coil C. Controller 32 may repeat this process until the measured magnetic flux is within a threshold difference of the expected value. Controller 32 may continue to monitor the magnetic flux and operating conditions to determine whether any changes occur sufficient to require further adjustments by control mechanism 28.

In one example, machine 10 may be light (e.g., small load) and traveling on flat ground. The operator provides input via operator input device 30, which controller 32 uses to adjust control mechanism 28. Control mechanism 28, which includes a switching mechanism, controls a timing of when switches open and close to adjust a rotational speed of the magnetic field produced by the stator. Sensors 34 may detect a state of the magnetic flux (e.g., magnitude and three-dimensional direction of the flux) associated with the magnetic field, and transmit a signal to controller 32. Controller 32 may compare an expected value of the flux, given the operating conditions, with a value associated with the state of the magnetic flux. Since machine 10 is light and traveling on flat ground, controller 32 may determine that a difference between the value and the expected value does not exceed a threshold, and therefore no adjustment to control mechanism 28 should be made.

In another example, machine 10 may be heavy and/or traveling uphill. These conditions may place additional torque on motor 16, changing the rotating magnetic field produced by stator 36. Sensors 34 may monitor a state of a magnetic flux associated with the field, and transmit a signal to controller 32. Based on the operating conditions (e.g., based on signals from sensors 33), controller 32 may determine that a value associated with the magnetic flux differs from an expected value by more than a threshold. Based on this comparison, controller 32 may adjust operation of control mechanism 28 to change the power produced by motor 16.

As described herein, controller 32 may adjust operation of control mechanism 28 to adjust power produced by at least one of the coils 40. For example, based on a determination that flux association with coil A differs from an expected value, controller 32 may adjust control mechanism to change a timing and/or magnitude of electrical current supplied to coil B. In this way, controller 32 adjusts the power produced by motor 16. Controller 32 may then check the magnetic flux associated with the changed electrical current provided to coil B, and determine whether the flux is close enough to the expected value to stop making changes. If more changes are necessary, controller 32 may again adjust control mechanism 28, this time to change the electrical current supplied to coil C. This process may repeat until the measured flux is within an expected range.

Consistent with this disclosure, control system 27 may detect situations in which the operation of motor 16 is inefficient and adjust operation of motor 16 to match the operating conditions. The example described above details how traveling with a heavy load and/or up a hill may require additional torque that is not efficiently supplied. It should be understood that control system 27 may also provide more efficient control when required torque is lower than expected, such as when machine 10 is traveling down a hill. This change in torque will also change the state of a magnetic flux produced by motor 18, which may be detected by sensors 34. Controller 32 may adjust operation of control mechanism 28 to lower the power provided to motor 16, thereby conserving energy.

By using flux feedback to control an electric motor, the disclosed control system may efficiently allocate power to the motor, taking into account the effect of operating conditions on magnetic flux. The efficient allocation of power may reduce an amount of wasted energy, thereby improving fuel economy as well as extending the lifetime of machine components, such as motors, generators, engines, and batteries.

It will be apparent to those skilled in the art that various modifications and variations can be made to the control system of the present disclosure without departing from the scope of the disclosure. Other embodiments will be apparent to those skilled in the art from consideration of the specification and practice of the embodiments disclosed herein. It is intended that the specification and examples be considered as exemplary only, with a true scope of the disclosure being indicated by the following claims.

What is claimed is:

1. A method of controlling an electric motor of a machine, comprising:
    determining, using a sensor, a state of a magnetic flux produced by the electric motor, wherein determining the state of the magnetic flux includes determining a state of a magnetic flux produced by a first coil of the electric motor;
    comparing, using a controller, a value associated with the state of the magnetic flux to an expected value, the expected value being based on one or more operating conditions of the machine;
    adjusting operation of a control mechanism that supplies electricity to the electric motor based on the comparison, wherein adjusting operation of the control mechanism includes changing an electrical current supplied to a second coil of the electric motor, based on a value associated with the state of the magnetic flux produced by the first coil being different than the expected value by more than a threshold; and
    operating the electric motor based on the adjusted operation of the control mechanism.

2. The method of claim 1, wherein the one or more operating conditions include at least one of a weight or tilt of the machine.

3. The method of claim 1, wherein determining the state of the magnetic flux includes determining a magnitude and three-dimensional direction of the magnetic flux.

4. The method of claim 3, wherein determining the state of the magnetic flux includes:
    determining a magnitude and three-dimensional direction of a magnetic flux associated with a first coil of the electric motor;
    determining a magnitude and three-dimensional direction of a magnetic flux associated with a second coil of the electric motor; and
    determining a magnitude and three-dimensional direction of a magnetic flux associated with a third coil of the electric motor.

* * * * *